(12) United States Patent
Liu et al.

(10) Patent No.: US 11,076,379 B2
(45) Date of Patent: Jul. 27, 2021

(54) PAGING METHOD AND APPARATUS

(71) Applicant: Huawei Technologies Co., Ltd., Shenzhen (CN)

(72) Inventors: Jianqin Liu, Beijing (CN); Chuanfeng He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 13 days.

(21) Appl. No.: 16/671,315

(22) Filed: Nov. 1, 2019

(65) Prior Publication Data
US 2020/0068525 A1 Feb. 27, 2020

Related U.S. Application Data

(63) Continuation of application No. PCT/CN2018/085547, filed on May 4, 2018.

(30) Foreign Application Priority Data

May 4, 2017 (CN) .......................... 201710309839.7

(51) Int. Cl.
*H04W 68/00* (2009.01)
*H04W 76/28* (2018.01)
(Continued)

(52) U.S. Cl.
CPC ....... *H04W 68/005* (2013.01); *H04W 56/001* (2013.01); *H04W 72/042* (2013.01);
(Continued)

(58) Field of Classification Search
CPC ... H04W 68/005; H04W 76/28; H04W 76/11; H04W 56/001; H04W 72/042;
(Continued)

(56) References Cited

U.S. PATENT DOCUMENTS

| 2013/0114484 | A1 | 5/2013 | Suzuki et al. |
| 2013/0303203 | A1 | 11/2013 | Wang et al. |
| 2019/0357170 | A1* | 11/2019 | Liu ........................ H04W 48/12 |

FOREIGN PATENT DOCUMENTS

| CN | 102857869 A | 1/2013 |
| CN | 104025679 A | 9/2014 |

(Continued)

OTHER PUBLICATIONS

Huawei et al., "Multi-beam Paging for NR",3GPP TSG RAN WG1 Meeting #88bis R1-1704189, Apr. 3-7, 2017,3 pages, Spokane, USA.

(Continued)

*Primary Examiner* — Nam T Huynh
(74) *Attorney, Agent, or Firm* — Slater Matsil, LLP

(57) ABSTRACT

A method includes: determining, by a terminal device within a discontinuous reception period, an occasion set for paging of the terminal device based on a terminal device identifier, where the occasion set for paging includes at least two occasions for paging; and receiving, in a time range corresponding to the occasions for paging included in the occasion set for paging, a paging message. One discontinuous reception period is partitioned into a plurality of occasion sets for paging, and one occasion set for paging includes at least two occasions for paging. After determining, within a discontinuous reception period, a corresponding occasion set for paging, the terminal device may receive a paging message on an occasion for paging included in the occasion set for paging.

23 Claims, 8 Drawing Sheets

(51) Int. Cl.
*H04W 76/11* (2018.01)
*H04W 56/00* (2009.01)
*H04W 72/04* (2009.01)

(52) U.S. Cl.
CPC ........ *H04W 72/0446* (2013.01); *H04W 76/11* (2018.02); *H04W 76/28* (2018.02)

(58) Field of Classification Search
CPC ... H04W 72/0446; H04W 68/02; H04W 4/02; H04W 68/00; H04W 72/0453; H04W 72/0493; H04B 7/0408
See application file for complete search history.

(56) References Cited

FOREIGN PATENT DOCUMENTS

| | | |
|---|---|---|
| CN | 106572534 A | 4/2017 |
| WO | 2013068241 A1 | 5/2013 |

OTHER PUBLICATIONS

Samsung,, "PO Determination for Paging Reception", 3GPP TSG-RAN WG2 Meeting #97bis, R2-1702893, Apr. 3-7, 2017, 3 pages, Spokane, USA.

"3rd Generation Partnership Project; Technical Specification Group Radio Access Network; New Generation Radio Access Network; User Equipment (UE) procedures in Idle mode (Release 15)", 3GPP TS 38.304 v0.0.1 (Mar. 2017), 13 pages.

NTT Docomo, Inc., "Discussion on paging design for NR", 3GPP TSG RAN WG1 Meeting #88bis R1-1705710, Apr. 3-7, 2017, 5 pages, Spokane, USA.

"3rd Generation Partnership Project; Technical Specification Group Radio Access Network; NR;Radio Resource Control (RRC); Protocol specification (Release 15)", 3GPP TS 38.331 V0.0.2 (Mar. 2017), 13 pages.

Huawei et al., "Paging mechanism in NR", 3GPP TSG-RAN WG2#97 R2-1701794, Feb. 13-17, 2017, 4 pages, Athens, Greece.

* cited by examiner

PAGING METHOD AND APPARATUS

CROSS-REFERENCE TO RELATED APPLICATIONS

This application is continuation application of International Application No. PCT/CN2018/085547, filed on May 4, 2018, which claims priority to Chinese Patent Application No. 201710309839.7, filed on May 4, 2017. The disclosures of the aforementioned applications are hereby incorporated by reference in their entireties.

TECHNICAL FIELD

This application relates to the communications field, and in particular, to a paging method and apparatus.

BACKGROUND

In a long term evolution (LTE) system, a radio signal between a base station and a terminal device is sent in a low frequency band. Therefore, a path loss of the radio signal is relatively small. To reduce an energy loss of the terminal device, the terminal device usually receives a paging message based on a discontinuous reception (DRX) mechanism. A process in which the terminal device receives the paging message mainly includes: detecting, by the terminal device in a time range corresponding to a preset occasion for paging in a discontinuous reception (DRX) period, whether a physical channel carries the paging message.

In a 5th generation system, a radio signal between a base station and a terminal device is sent in a high frequency band, and a frequency increase causes attenuation of radio signal transmission to increase, resulting in an increase in a path loss of the radio signal. Therefore, in the 5G system, a very high antenna gain is usually formed by using a beam forming technique of the base station, to compensate for the path loss. However, in the 5G system, a beam sent by the base station can cover only some areas in a cell, and there may be a case in which some terminal devices cannot receive a paging message. To ensure that all terminal devices located in different areas in the cell can receive the paging message, the paging message may be sent by using a plurality of beams. The beams cover the different areas in the cell. When the paging message is sent by using the plurality of beams, a plurality of DRX periods need to be correspondingly occupied. Similarly, when receiving the paging message, the terminal devices may also need to occupy a plurality of DRX periods. Consequently, a transmission delay of the paging message in the 5G system is relatively long.

SUMMARY

This application provides a paging method and apparatus, to resolve a problem that a transmission delay of a paging message in a 5G system is relatively long.

One aspect of this application provides a paging method, including: determining, by a terminal device based on a terminal device identifier, an occasion set for paging of the terminal device within a discontinuous reception period, where the occasion set for paging includes at least two occasions for paging; and receiving, in a time range corresponding to the occasions for paging included in the occasion set for paging, a paging message.

One discontinuous reception period is partitioned into a plurality of occasion sets for paging, and one occasion set for paging includes at least two occasions for paging. Therefore, after determining a corresponding occasion set for paging within a discontinuous reception period, the terminal device may receive a paging message on an occasion for paging included in the occasion set for paging. In this way, the terminal device may receive, in one discontinuous reception period, a paging message for a plurality of times, thereby increasing a speed of receiving the paging message.

In a possible implementation, before the determining, by a terminal device based on a terminal device identifier, an occasion set for paging of the terminal device within a discontinuous reception period, the paging method further includes: determining a total quantity of occasions for paging included in the occasion set for paging, and location information of all occasions for paging within the discontinuous reception period; and determining, based on the total quantity of occasions for paging included in the occasion set for paging, and the location information of all the occasions for paging within the discontinuous reception period, at least one occasion set for paging within the discontinuous reception period.

In a possible implementation, all occasions for paging in any occasion set for paging are consecutive occasions for paging in a set including all the occasions for paging within the discontinuous reception period.

In a possible implementation, the determining a total quantity of occasions for paging included in the occasion set for paging includes: obtaining a total quantity of synchronization signals in a synchronization signal set by using carrier information or broadcast information, and determining, based on the total quantity of synchronization signals, the total quantity of occasions for paging included in the occasion set for paging; or obtaining system information, where the system information includes the total quantity of occasions for paging included in the occasion set for paging; or obtaining system information, where the system information includes a quantity of paging radio frames included in the occasion set for paging and a quantity of occasions for paging included in the paging radio frames, and determining, based on the quantity of paging radio frames included in the occasion set for paging and the quantity of occasions for paging included in the paging radio frames, the total quantity of occasions for paging included in the occasion set for paging.

In a possible implementation, an intersection set exists between a set including subframes in which the synchronization signals in the synchronization signal set are located and a set including subframes in which the occasions for paging in the occasion set for paging of the terminal device are located.

In a possible implementation, the determining, by a terminal device based on a terminal device identifier, an occasion set for paging of the terminal device within a discontinuous reception period, includes: determining, by the terminal device based on the terminal device identifier, a paging radio frame of the terminal device within the discontinuous reception period, and determining, in the paging radio frame of the terminal device, an initial occasion for paging; obtaining, by the terminal device, a preset quantity of occasion for paging offsets; and determining, by the terminal device, all the occasions for paging in the occasion set for paging of the terminal device based on the initial occasion for paging and the preset quantity of occasion for paging offsets.

In a possible implementation, before the obtaining a preset quantity of occasion for paging offsets, the paging method further includes: obtaining the preset quantity by using carrier information or broadcast information; or obtaining system information, where the system information includes the preset quantity.

In a possible implementation, subframes corresponding to the occasions for paging in the occasion set for paging of the terminal device are consecutive subframes in a paging radio frame.

In a possible implementation, in the paging radio frame including the occasions for paging of the terminal device, the subframes corresponding to the occasions for paging have a first subcarrier spacing, and a remaining subframe in the paging radio frame has a second subcarrier spacing, where the first subcarrier spacing is greater than the second subcarrier spacing.

An embodiment of this application further provides a paging method, applied to a network device, corresponding to the foregoing paging method applied to a terminal device side, and having a corresponding technical feature and technical effect. Details are not described in this application again.

Another aspect of embodiments of this application further provides a paging method, including: determining, by a network device, a to-be-paged terminal device; and determining, by the network device, an occasion set for paging of the to-be-paged terminal device within a discontinuous reception period, where the occasion set for paging includes at least two occasions for paging, and the occasions for paging included in the occasion set for paging are used to send a paging message to the to-be-paged terminal device.

In a possible implementation, before the determining, by the network device, an occasion set for paging of the to-be-paged terminal device within a discontinuous reception period, the method further includes: determining a total quantity of occasions for paging included in the occasion set for paging, and location information of all occasions for paging within the discontinuous reception period; and determining based on the total quantity of occasions for paging included in the occasion set for paging, and the location information of all the occasions for paging within the discontinuous reception period, at least one occasion set for paging within the discontinuous reception period.

In a possible implementation, all occasions for paging in any occasion set for paging are consecutive occasions for paging in a set including all the occasions for paging within the discontinuous reception period.

In a possible implementation, the method further includes: indicating, to the terminal device by using carrier information or broadcast information, the total quantity of occasions for paging included in the occasion set for paging; or sending system information to the terminal device, where the system information includes the total quantity of occasions for paging included in the occasion set for paging; or sending system information to the terminal device, where the system information includes a quantity of paging radio frames included in the occasion set for paging and a quantity of occasions for paging included in the paging radio frames.

In a possible implementation, an intersection set exists between a set including subframes in which synchronization signals in a synchronization signal set are located and a set including subframes in which the occasions for paging in the occasion set for paging of the terminal device are located.

In a possible implementation, the determining, by the network device, an occasion set for paging of the to-be-paged terminal device within a discontinuous reception period includes: determining, based on an identifier of the to-be-paged terminal device, a paging radio frame of the to-be-paged terminal device within the discontinuous reception period, and determining, in the paging radio frame of the terminal device, an initial occasion for paging; obtaining a preset quantity of occasion for paging offsets; and determining all the occasions for paging in the occasion set for paging of the to-be-paged terminal device based on the initial occasion for paging and the preset quantity of occasion for paging offsets.

In a possible implementation, the method further includes: indicating the preset quantity to the terminal device by using carrier information or broadcast information; or sending system information to the terminal device, where the system information includes the preset quantity.

In a possible implementation, subframes corresponding to the occasions for paging in the occasion set for paging of the to-be-paged terminal device are consecutive subframes in a paging radio frame.

In a possible implementation, in the radio paging radio frame including the occasions for paging of the to-be-paged terminal device, the subframes corresponding to the occasions for paging have a first subcarrier spacing, and a remaining subframe in the paging radio frame has a second subcarrier spacing, where the first subcarrier spacing is greater than the second subcarrier spacing.

An embodiment of this application further provides a paging apparatus, configured to perform the foregoing paging method, and the paging method has a same technical feature and technical effect. Details are not described in this application again.

Still another aspect of the embodiments of this application further provides a paging apparatus, configured to perform the foregoing corresponding paging method on the terminal device side, and including: an occasion set for paging determining module, configured to determine based on a paging apparatus identifier, an occasion set for paging of the paging apparatus within a discontinuous reception period, where the occasion set for paging includes at least two occasions for paging; and a paging message receiving module, configured to receive, in a time range corresponding to the occasions for paging included in the occasion set for paging, a paging message.

In a possible implementation, the paging apparatus further includes: an information obtaining module, configured to determine a total quantity of occasions for paging included in the occasion set for paging, and location information of all occasions for paging within the discontinuous reception period; and an occasion set for paging partitioning module, configured to determine, based on the total quantity of occasions for paging included in the occasion set for paging, and the location information of all the occasions for paging within the discontinuous reception period, at least one occasion set for paging within the discontinuous reception period.

In a possible implementation, all occasions for paging in any occasion set for paging are consecutive occasions for paging in a set including all the occasions for paging within the discontinuous reception period.

In a possible implementation, the information obtaining module is specifically configured to: obtain a total quantity of synchronization signals in a synchronization signal set by using carrier information or broadcast information, and determine, based on the total quantity of synchronization signals, the total quantity of occasions for paging included in the occasion set for paging; or obtain system information, where the system information includes the total quantity of occasions for paging included in the occasion set for paging; or obtain system information, where the system information includes a quantity of paging radio frames included in the occasion set for paging and a quantity of occasions for paging included in the paging radio frames, and determine, based on the quantity of paging radio frames included in the occasion set for paging and the quantity of occasions for paging included in the paging radio frames, the total quantity of occasions for paging included in the occasion set for paging.

In a possible implementation, an intersection set exists between a set including subframes in which the synchronization signals in the synchronization signal set are located and a set including subframes in which the occasions for paging in the occasion set for paging of the terminal device are located.

In a possible implementation, the occasion set for paging determining module is specifically configured to: determine, based on the paging apparatus identifier, a paging radio frame of the paging apparatus within the discontinuous reception period, and determine, in the paging radio frame of the paging apparatus, an initial occasion for paging; obtain a preset quantity of occasion for paging offsets; and determine all the occasions for paging in the occasion set for paging of the paging apparatus based on the initial occasion for paging and the preset quantity of occasion for paging offsets.

In a possible implementation, the information obtaining module is further configured to: obtain the preset quantity by using carrier information or broadcast information; or obtain system information, where the system information includes the preset quantity.

In a possible implementation, subframes corresponding to the occasions for paging in the occasion set for paging of the paging apparatus are consecutive subframes in a paging radio frame.

In a possible implementation, in the paging radio frame including the occasions for paging of the paging apparatus, the subframes corresponding to the occasions for paging have a first subcarrier spacing, and a remaining subframe in the paging radio frame has a second subcarrier spacing, where the first subcarrier spacing is greater than the second subcarrier spacing.

Yet another aspect of the embodiments of this application further provides a paging apparatus, configured to perform the foregoing corresponding paging method on a network device side, and including: a terminal device determining module, configured to determine a to-be-paged terminal device; and an occasion set for paging determining module, configured to determine, within a discontinuous reception period, an occasion set for paging of the to-be-paged terminal device, where the occasion set for paging includes at least two occasions for paging, and the occasions for paging included in the occasion set for paging are used to send a paging message to the to-be-paged terminal device.

In a possible implementation, the paging apparatus further includes: an information obtaining module, configured to determine a total quantity of occasions for paging included in the occasion set for paging, and location information of all occasions for paging within the discontinuous reception period; and an occasion set for paging partitioning module, configured to determine, based on the total quantity of occasions for paging included in the occasion set for paging, and the location information of all the occasions for paging within the discontinuous reception period, at least one occasion set for paging within the discontinuous reception period.

In a possible implementation, all occasions for paging in any occasion set for paging are consecutive occasions for paging in a set including all the occasions for paging within the discontinuous reception period.

In a possible implementation, the paging apparatus further includes a sending module. The sending module is configured to: indicate, to the terminal device by using carrier information or broadcast information, the total quantity of occasions for paging included in the occasion set for paging; or send system information to the terminal device, where the system information includes the total quantity of occasions for paging included in the occasion set for paging; or send system information to the terminal device, where the system information includes a quantity of paging radio frames included in the occasion set for paging and a quantity of occasions for paging included in the paging radio frames.

In a possible implementation, an intersection set exists between a set including subframes in which synchronization signals in a synchronization signal set are located and a set including subframes in which the occasions for paging in the occasion set for paging of the terminal device are located.

In a possible implementation, the occasion set for paging determining module is specifically configured to: determine, based on an identifier of the to-be-paged terminal device, a paging radio frame of the to-be-paged terminal device within the discontinuous reception period, and determine, in the paging radio frame of the terminal device, an initial occasion for paging; obtain a preset quantity of occasion for paging offsets; and determine all the occasions for paging in the occasion set for paging of the to-be-paged terminal device based on the initial occasion for paging and the preset quantity of occasion for paging offsets.

In a possible implementation, the paging apparatus further includes a sending module. The sending module is configured to: indicate the preset quantity to the terminal device by using carrier information or broadcast information; or send system information to the terminal device, where the system information includes the preset quantity.

In a possible implementation, subframes corresponding to the occasions for paging in the occasion set for paging of the to-be-paged terminal device are consecutive subframes in a paging radio frame.

In a possible implementation, in the radio paging radio frame including the occasions for paging of the to-be-paged terminal device, the subframes corresponding to the occasions for paging have a first subcarrier spacing, and a remaining subframe in the paging radio frame has a second subcarrier spacing, where the first subcarrier spacing is greater than the second subcarrier spacing.

An embodiment of this application further provides a terminal device and a network device, configured to perform the foregoing paging method, and the paging method has a same technical feature and technical effect. This is not described in detail in this application again.

Still yet another aspect of the embodiments of this application further provides a terminal device, including: a receiver, a memory, a processor, and at least one communications bus. The communications bus is configured to implement communication connections between components. The memory stores various programs to complete various processing functions and implement method steps in this embodiment. The processor is configured to execute the programs stored in the memory. The processor is configured to: determine an occasion set for paging of the terminal device based on a terminal device identifier, within a discontinuous reception period, where the occasion set for paging includes at least two occasions for paging; and receive, in a time range corresponding to the occasions for paging included in the occasion set for paging, a paging message.

In a possible implementation, the processor is further configured to: determine a total quantity of occasions for paging included in the occasion set for paging, and location information of all occasions for paging within the discontinuous reception period; and determine based on the total quantity of occasions for paging included in the occasion set for paging, and the location information of all the occasions for paging within the discontinuous reception period, at least one occasion set for paging within the discontinuous reception period.

In a possible implementation, all occasions for paging in any occasion set for paging are consecutive occasions for paging in a set including all the occasions for paging within the discontinuous reception period.

In a possible implementation, the processor is specifically configured to: obtain a total quantity of synchronization signals in a synchronization signal set by using carrier information or broadcast information, and determine, based on the total quantity of synchronization signals, the total quantity of occasions for paging included in the occasion set for paging; or obtain system information, where the system information includes the total quantity of occasions for paging included in the occasion set for paging; or obtain system information, where the system information includes a quantity of paging radio frames included in the occasion set for paging and a quantity of occasions for paging included in the paging radio frames, and determine, based on the quantity of paging radio frames included in the occasion set for paging and the quantity of occasions for paging included in the paging radio frames, the total quantity of occasions for paging included in the occasion set for paging.

In a possible implementation, an intersection set exists between a set including subframes in which the synchronization signals in the synchronization signal set are located and a set including subframes in which the occasions for paging in the occasion set for paging of the terminal device are located.

In a possible implementation, the processor is specifically configured to: determine based on the terminal device identifier, a paging radio frame of the terminal device within the discontinuous reception period, and determine, in the paging radio frame of the terminal device, an initial occasion for paging; obtain a preset quantity of occasion for paging offsets; and determine all the occasions for paging in the occasion set for paging of the terminal device based on the initial occasion for paging and the preset quantity of occasion for paging offsets.

In a possible implementation, the processor is further configured to: obtain the preset quantity by using carrier information or broadcast information; or obtain system information, where the system information includes the preset quantity.

In a possible implementation, subframes corresponding to the occasions for paging in the occasion set for paging of the terminal device are consecutive subframes in a paging radio frame.

In a possible implementation, in the paging radio frame including the occasions for paging of the terminal device, the subframes corresponding to the occasions for paging have a first subcarrier spacing, and a remaining subframe in the paging radio frame has a second subcarrier spacing, where the first subcarrier spacing is greater than the second subcarrier spacing.

A still yet further aspect of the embodiments of this application further provides a network device, including: a transmitter, a memory, a processor, and at least one communications bus. The communications bus is configured to implement communication connections between components. The memory stores various programs to complete various processing functions and implement method steps in this embodiment. The processor is configured to execute the programs stored in the memory. The processor is configured to: determine a to-be-paged terminal device; determine an occasion set for paging of the to-be-paged terminal device within a discontinuous reception period, where the occasion set for paging includes at least two occasions for paging, and the occasions for paging included in the occasion set for paging are used to send a paging message to the to-be-paged terminal device.

In a possible implementation, the processor is further configured to: determine a total quantity of occasions for paging included in the occasion set for paging, and location information of all occasions for paging within the discontinuous reception period; and determine based on the total quantity of occasions for paging included in the occasion set for paging, and the location information of all the occasions for paging within the discontinuous reception period, at least one occasion set for paging within the discontinuous reception period.

In a possible implementation, all occasions for paging in any one occasion set for paging are consecutive occasions for paging in a set including all the occasions for paging within the discontinuous reception period.

In a possible implementation, the transmitter is configured to: indicate, to the terminal device by using carrier information or broadcast information, the total quantity of occasions for paging included in the occasion set for paging; or send system information to the terminal device, where the system information includes the total quantity of occasions for paging included in the occasion set for paging; or send system information to the terminal device, where the system information includes a quantity of paging radio frames included in the occasion set for paging and a quantity of occasions for paging included in the paging radio frames.

In a possible implementation, an intersection set exists between a set including subframes in which synchronization signals in a synchronization signal set are located and a set including subframes in which the occasions for paging in the occasion set for paging of the terminal device are located.

In a possible implementation, the processor is specifically configured to: determine based on an identifier of the to-be-paged terminal device, a paging radio frame of the to-be-paged terminal device within the discontinuous reception period, and determine, in the paging radio frame of the terminal device, an initial occasion for paging; obtain a preset quantity of occasion for paging offsets; and determine all the occasions for paging in the occasion set for paging of the to-be-paged terminal device based on the initial occasion for paging and the preset quantity of occasion for paging offsets.

In a possible implementation, the transmitter is configured to: indicate the preset quantity to the terminal device by using carrier information or broadcast information; or send system information to the terminal device, where the system information includes the preset quantity.

In a possible implementation, subframes corresponding to the occasions for paging in the occasion set for paging of the to-be-paged terminal device are consecutive subframes in a paging radio frame.

In a possible implementation, in the radio paging radio frame including the occasions for paging of the to-be-paged terminal device, the subframes corresponding to the occasions for paging have a first subcarrier spacing, and a remaining subframe in the paging radio frame has a second subcarrier spacing, where the first subcarrier spacing is greater than the second subcarrier spacing.

An embodiment of this application further provides a program. When being executed by a processor, the program is configured to perform the foregoing corresponding paging method on the network device side.

An embodiment of this application further provides a program product, for example, a computer-readable storage medium, including the foregoing program.

An embodiment of this application further provides a computer-readable storage medium. The computer-readable storage medium stores an instruction. When the instruction is run on a computer, the computer is enabled to perform the foregoing corresponding paging method on the network device side.

An embodiment of this application further provides a program. When being executed by a processor, the program is configured to perform the foregoing corresponding paging method on the terminal device side.

An embodiment of this application further provides a program product, for example, a computer-readable storage medium, including the foregoing program.

An embodiment of this application further provides a computer-readable storage medium. The computer-readable storage medium stores an instruction. When the instruction is run on a computer, the computer is enabled to perform the foregoing corresponding paging method on the terminal device side.

DETAILED DESCRIPTION OF ILLUSTRATIVE EMBODIMENTS

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 1:
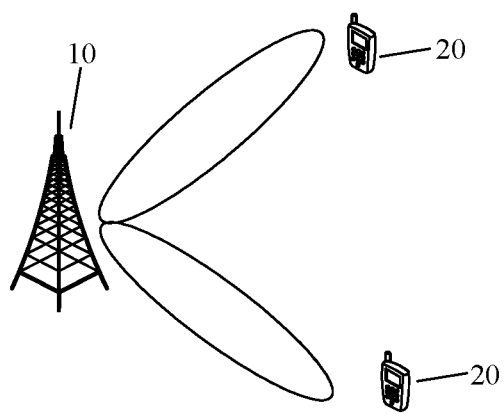
FIG. 1 shows a network architecture to which an embodiment of this application may be applicable.

The following describes a possible network architecture according to an embodiment of this application with reference to FIG. 1. FIG. 1 shows a network architecture to which an embodiment of this application may be applicable. As shown in FIG. 1, the network architecture provided in this embodiment includes a network device 10 and a terminal device 20.

The network device 10 is a device that connects the terminal device to a wireless network, and may be a base transceiver station (BTS for short) in global mobile communications (GSM for short) or code division multiple access (CDMA for short), or may be a NodeB (NB for short) in wideband code division multiple access (WCDMA for short), or may be an evolved NodeB (eNB or eNodeB for short) in long term evolution (LTE for short), a relay node or an access point, a base station in a future 5G network, or the like. This is not limited herein. FIG. 1 is a possible schematic diagram that is drawn by using an example in which the network device is a base station.

A terminal device 20 may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a radio access network (RAN for short). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS for short) phone, a cordless telephone set, a Session Initiation Protocol (SIP for short) phone, a wireless local loop (WLL for short) station, or a personal digital assistant (PDA for short). The wireless terminal may also be referred to as a system, a subscriber unit, a subscriber station, a mobile station, a mobile console, a remote station, a remote terminal, an access terminal, a user terminal, a user agent. The present invention is not limited thereto. FIG. 1 is a possible schematic diagram that is drawn by using an example in which the terminal device is a cellular telephone.

In an LTE system, a status of the terminal device includes an idle state and a connected state. The network device may obtain context information of the terminal device in the connected state, and send information to the terminal device in the connected state. However, the network device does not know whether a cell to which the network device belongs includes a terminal device in the idle state and a quantity of terminal devices in the idle state. By using a paging process, the network device may send a call request to a terminal device in the idle state within a range of this cell, or notify a system information update, and notify information such as earthquake and tsunami warning information (ETWS) and a commercial mobile alert service (CMAS). The paging process may be triggered by a core network device or triggered by a network device.

Figure 2:
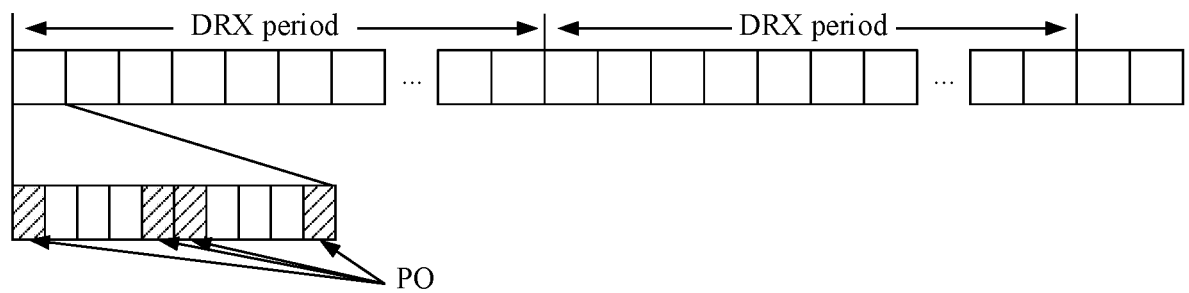
FIG. 2 is a first schematic structural diagram of a DRX period according to this application.

When the terminal device in the LTE system is in the idle state, paging is performed by using a DRX mechanism to reduce power consumption and increase a battery lifespan. In the DRX mechanism, one DRX period includes at least one paging radio frame (PF), one PF includes 10 subframes, and at least one occasion for paging (PO) exists in the 10 subframes. All radio frames in one DRX period may be paging radio frames. FIG. 2 is a schematic structural diagram of a DRX period according to this application. FIG. 2 shows two consecutive DRX periods as an example, and describes an example in which one PF includes four POs.

A paging process using a DRX mechanism specifically includes: A terminal device receives, in one DRX period, a paging message only on an occasion for paging in a particular paging radio frame. Therefore, in one DRX period, the terminal device may receive the paging message only in a time period corresponding to the PO, and may sleep at other time, to reduce an energy loss.

In an existing LTE system, a radio signal between a network device and a terminal device is sent in a low frequency band. Therefore, a path loss of the radio signal is relatively small, and a beam sent by the network device is relatively wide and can cover all areas of a cell. However, in a 5G system, a radio signal between a network device and a terminal device is sent in a high frequency band. A frequency increase causes attenuation of radio signal transmission to increase, resulting in an increase in a path loss of the radio signal. Therefore, in the 5G system, a very high antenna gain is usually formed by using a beam forming technique of a base station, to compensate for the path loss. Beams for which the beam forming technique is used can cover only some areas of a cell. As shown in FIG. 1, coverage areas of the two beams are both relatively small and cannot cover all areas of a cell in which the network device is located. Therefore, there may be a case in which some terminal devices cannot receive a paging message. To ensure that all terminal devices located in different areas in the cell can receive the paging message, the paging message may be sent by using a plurality of beams. The beams cover the different areas in the cell. When the paging message is sent by using the plurality of beams, a plurality of DRX periods need to be correspondingly occupied. In this paging method, a sending delay of sending the paging message by the network device to the terminal devices is relatively long.

Figure 3:
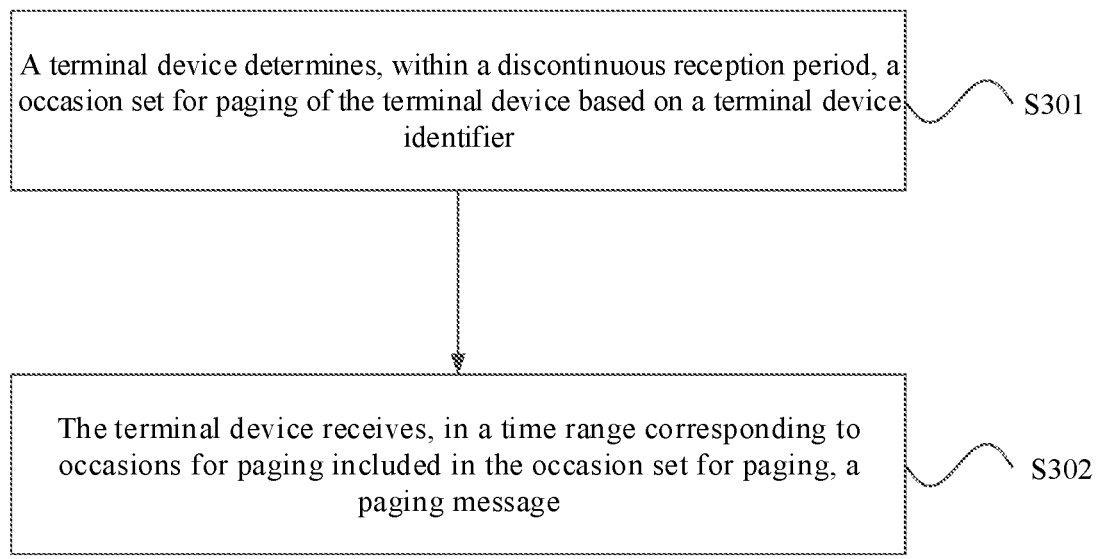
FIG. 3 is a schematic flowchart of Embodiment 1 of a paging method according to this application.

To resolve the foregoing problem, one aspect of the embodiments of this application provides a paging method, and the method is performed by a terminal device. In the embodiments of this application, the terminal device may receive a paging message on a plurality of occasions for paging within one DRX period, reducing a sending delay of the paging message. FIG. 3 is a schematic flowchart of Embodiment 1 of a paging method according to this application. As shown in FIG. 3, the paging method includes the following steps.

S301. A terminal device determines based on a terminal device identifier, an occasion set for paging of the terminal device within a discontinuous reception period.

The occasion set for paging includes at least two occasions for paging.

For example, the discontinuous reception period includes at least one occasion set for paging, and the occasion set for paging includes at least two occasions for paging. The two occasions for paging may belong to a same paging radio frame or different paging radio frames. One occasion set for paging may include one or more paging radio frames, and one paging radio frame may belong to plurality of occasion sets for paging. However, one occasion for paging belongs to only one occasion set for paging, and each occasion set for paging corresponds to one index. The terminal device may determine the corresponding occasion set for paging based on the identifier of the terminal device. The terminal device may directly determine an index of corresponding occasion set for paging based on an international mobile subscriber identity (IMSI). Optionally, calculation may be alternatively performed based on the IMSI to obtain the index of corresponding occasion set for paging. For example, the index of corresponding occasion set for paging of the terminal device=UE_ID mod L. UE_ID=IMSI mod a preset value. For example, the preset value may be 1024, L indicates a quantity of occasion sets for paging within the discontinuous reception period, and mod indicates an REM operation.

S302. The terminal device receives, in a time range corresponding to the occasions for paging included in the occasion set for paging, a paging message.

For example, the terminal device receives the paging message on the occasions for paging included in the determined occasion set for paging. A process of receiving the paging message may specifically include: The terminal device detects, in a subframe corresponding to an occasion for paging, whether a physical downlink control channel carries a paging radio network temporary identifier (P-RNTI). If the physical downlink control channel carries no paging radio network temporary identifier, it is considered that a network device does not send the paging message to the terminal device, and the terminal device enters an idle state and attempts to receive the paging message again on a next occasion for paging. If the physical downlink control channel carries the P-RNTI, whether the physical downlink shared channel carries the paging message is further detected.

Optionally, the terminal device receives the paging message on all the occasions for paging included in the occasion set for paging. Optionally, a process in which the terminal device receives the paging message on the occasions for paging included in the occasion set for paging specifically includes: Before the paging message is received, the terminal device sequentially determines, based on a time sequence, in the time range corresponding to the occasions for paging included in the occasion set for paging, whether the paging message is received. For example, before the receiving succeeds, the terminal device first attempts to receive the paging message on a first occasion for paging in the occasion set for paging, and the terminal device attempts to receive the paging message on a second occasion for paging in the occasion set for paging when the receiving fails. Alternatively, the terminal device attempts to receive the paging message on all the occasions for paging in the occasion set for paging.

This embodiment of this application provides a paging method, including: determining, by a terminal device based on a terminal device identifier, an occasion set for paging of the terminal device within a discontinuous reception period, where the occasion set for paging includes at least two occasions for paging; and receiving, by the terminal device in a time range corresponding to the at least two occasions for paging included in the occasion set for paging, a paging message. In this embodiment of this application, one discontinuous reception period is partitioned into a plurality of occasion sets for paging, and one occasion set for paging includes at least two occasions for paging. Therefore, after determining a corresponding occasion set for paging within a discontinuous reception period, the terminal device may receive a paging message on an occasion for paging included in the occasion set for paging. In this way, the terminal device may receive, in one discontinuous reception period, a paging message for a plurality of times, thereby increasing a speed of receiving the paging message.

Figure 4:
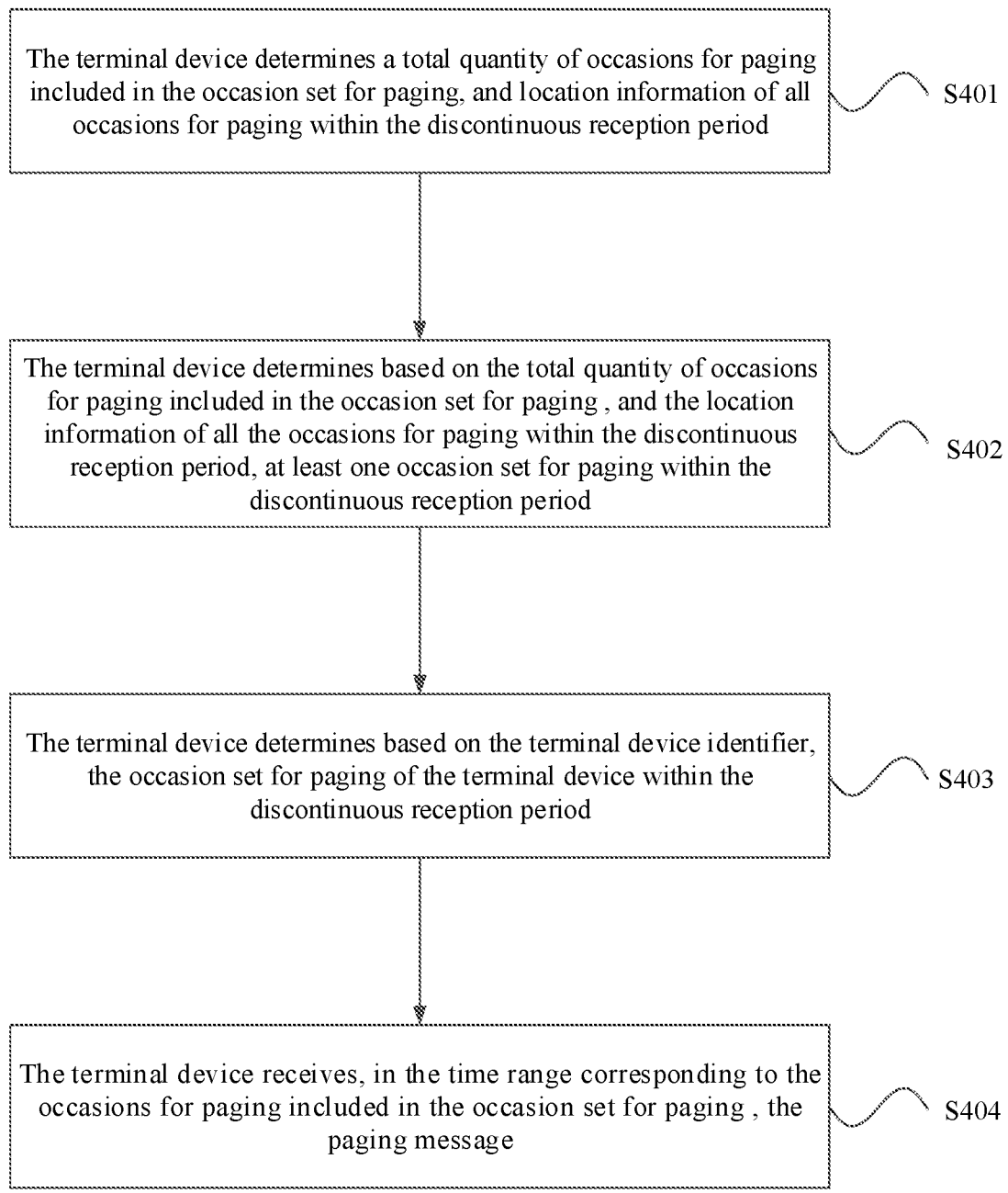
FIG. 4 is a schematic flowchart of Embodiment 2 of a paging method according to this application.

Further, based on the embodiment shown in FIG. 3, an embodiment of this application further provides a paging method. In this embodiment, a method for determining by the terminal device, the occasion set for paging within the discontinuous reception period is described in detail. FIG. 4 is a schematic flowchart of Embodiment 2 of a paging method according to this application. As shown in FIG. 4, before the terminal device determines based on the terminal device identifier, the occasion set for paging of the terminal device within the discontinuous reception period, the method includes the following steps.

S401. The terminal device determines a total quantity of occasions for paging included in the occasion set for paging, and location information of all occasions for paging within the discontinuous reception period.

For example, when the discontinuous reception period is divided into a plurality of occasion sets for paging, the terminal device first determines a total quantity M of occasions for paging included in the occasion sets for paging, and location information of all occasions for paging within the discontinuous reception period. M is a positive integer greater than 1. For example, the location information is a number of a paging radio frame in which all the occasions for paging within the discontinuous reception period are located, and numbers, in the paging radio frame, of subframes in which the occasions for paging are located.

S402. The terminal device determines based on the total quantity of occasions for paging included in the occasion set for paging, and the location information of all the occasions for paging within the discontinuous reception period, at least one occasion set for paging within the discontinuous reception period.

Figure 5:
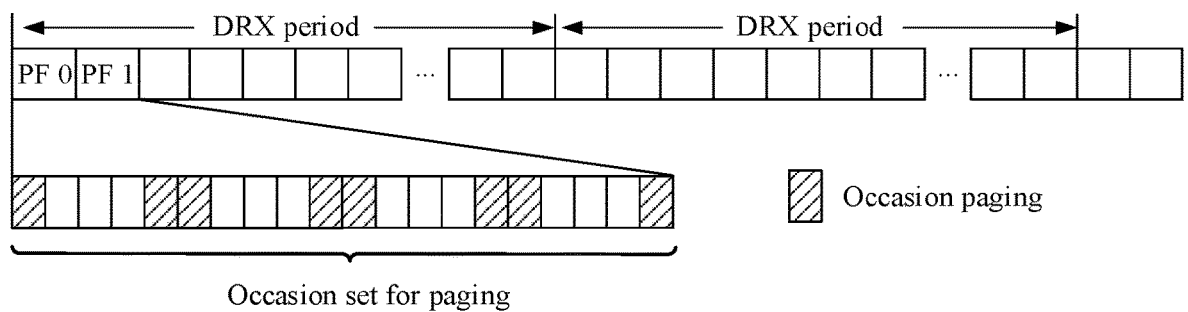
FIG. 5 is a second schematic structural diagram of a DRX period according to this application.

For example, the terminal device determines based on the total quantity M of occasions for paging included in the occasion sets for paging, a plurality of occasion sets for paging within the discontinuous reception period. Each occasion set for paging includes M occasions for paging. Optionally, the M occasions for paging may be distributed in a same paging radio frame or different paging radio frames. FIG. 5 is a second schematic structural diagram of a DRX period according to this application. As shown in FIG. 5, an occasion set for paging includes eight occasions for paging, and the eight occasions for paging are distributed in two paging radio frames: a PF 0 and a PF 1.

Optionally, all occasions for paging in any occasion set for paging are consecutive in a set including all the occasions for paging within a discontinuous reception period.

For example, as shown in FIG. 5, when an occasion set for paging is determined based on the total quantity M of the occasions for paging included in the occasion sets for paging, M occasions for paging are sequentially selected from the set including all the occasions for paging within the discontinuous reception period, to form the occasion set for paging. A paging delay can be reduced by selecting and using the consecutive occasions for paging in the set including all the occasions for paging within the discontinuous reception period.

S403. The terminal device determines based on the terminal device identifier, the occasion set for paging of the terminal device within the discontinuous reception period.

S404. The terminal device receives, in the time range corresponding to the occasions for paging included in the occasion set for paging, the paging message.

S403 and S404 are the same as S301 and S302 in the embodiment shown in FIG. 3. Details are not described in this embodiment of this application again.

Optionally, based on any one of the foregoing embodiments, a method for determining the total quantity of occasions for paging included in the occasion set for paging includes the following feasible implementations:

First Feasible Implementation:

Configuration information is obtained. The configuration information includes at least one of the following: carrier information or broadcast information. A total quantity of synchronization signals in a synchronization signal set is obtained based on the configuration information, and the total quantity of occasions for paging included in the occasion set for paging is determined based on the total quantity of synchronization signals.

For example, the terminal device receives the configuration information, and the configuration information may be the carrier information and/or the broadcast information. After receiving the configuration information, the terminal device obtains the total quantity of synchronization signals in the synchronization signal set based on the configuration information. The synchronization signal set includes at least two synchronization signal blocks, and a synchronization signal block includes a primary synchronization signal and a secondary synchronization signal. The terminal device receives, within one synchronization signal period, all the synchronization signal blocks in the synchronization signal set. The terminal device may determine, based on the total quantity of synchronization signals, the total quantity of occasions for paging included in the occasion set for paging. For example, the total quantity of synchronization signals is used as the total quantity of occasions for paging included in the occasion set for paging.

Optionally, an intersection set exists between a set including subframes in which the synchronization signals in the synchronization signal set are located and a set including subframes in which the occasions for paging in the occasion set for paging of the terminal device are located.

Specifically, considering that the subframes corresponding to the occasions for paging cannot be used as some service subframes to transmit data of a service, for example, a multimedia broadcast multicast (MBMS) service, the subframes in which the occasions for paging are located may be set to be consistent with the subframes in which the synchronization signals are located as much as possible to reduce subframe occupation.

Second Feasible Implementation:

System information is obtained. The system information includes the total quantity of occasions for paging included in the occasion set for paging.

Specifically, the terminal device directly receives a system message sent by the network device, and the system message carries the total quantity of occasions for paging included in the occasion set for paging.

Third Feasible Implementation:

System information is obtained. The system message includes a quantity of paging radio frames included in the occasion set for paging and a quantity of occasions for paging included in the paging radio frames. The total quantity of occasions for paging included in the occasion set for paging is determined based on the quantity of paging radio frames included in the occasion set for paging and the quantity of occasions for paging included in the paging radio frames.

Specifically, the terminal device obtains the system information. The system message includes the quantity of PFs included in the occasion set for paging and the quantity of POs included in the PFs. The terminal device determines, based on the quantity of PFs and the quantity of POs, the total quantity of occasions for paging included in the occasion set for paging. For example, the terminal device may obtain, by multiplying the quantity of PFs by the quantity of POs, the total quantity of occasions for paging included in the occasion set for paging.

Figure 6:
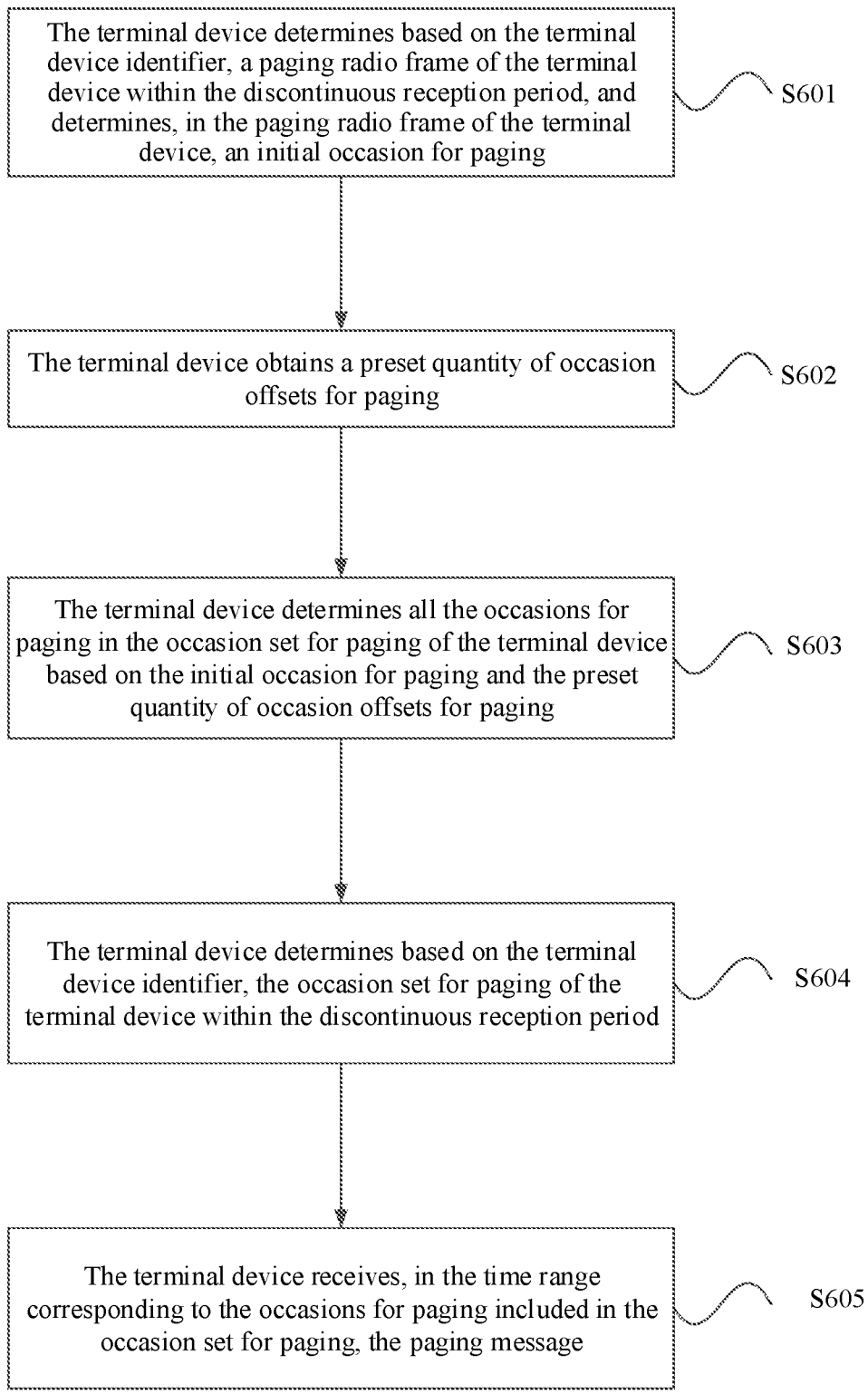
FIG. 6 is a schematic flowchart of Embodiment 3 of a paging method according to this application.

Based on the embodiment shown in FIG. 3, an embodiment of this application further provides a paging method. In this embodiment, a method for determining the occasion set for paging within the discontinuous reception period by the terminal device is described in detail. FIG. 6 is a schematic flowchart of Embodiment 3 of a paging method according to an embodiment of this application. As shown in FIG. 6, the paging method includes the following steps.

S601. The terminal device determines based on the terminal device identifier, a paging radio frame of the terminal device within the discontinuous reception period, and determines, in the paging radio frame of the terminal device, an initial occasion for paging.

Specifically, the discontinuous reception period includes at least one paging radio frame, and the terminal device may determine the paging radio frame of the terminal device based on the terminal device identifier. For example, a location of a paging radio frame of the terminal device within one discontinuous reception period may be determined based on a formula PF=(T div N)*(UE_ID mod N). T is a length of the discontinuous reception period of the terminal device, and a unit of T is a radio frame. The terminal device may determine T based on a system message. N indicates a quantity of PFs within one discontinuous reception period.

For example, after the paging radio frame of the terminal device is determined, the initial occasion for paging is determined in the paging radio frame of the terminal device. The initial occasion for paging may be obtained based on a formula i_s(o)=floor(UE_ID/N) mod Ns. Ns indicates a quantity of POs in one PF. floor indicates an operation of rounding down to the nearest integer. The terminal device starts to receive the paging message at a moment corresponding to the initial occasion for paging.

S602. The terminal device obtains a preset quantity of occasion for paging offsets.

For example, the terminal device obtains the preset quantity of occasion for paging offsets Offset(n), where n=1, . . . , Nb. Nb indicates a quantity of occasions for paging in one occasion set for paging.

S603. The terminal device determines all the occasions for paging in the occasion set for paging of the terminal device based on the initial occasion for paging and the preset quantity of occasion for paging offsets.

For example, the terminal device determines all the occasions for paging in the occasion set for paging of the terminal device based on the initial occasion for paging and the preset quantity of occasion for paging offsets. For example, subframes corresponding to the occasions for paging in the occasion set for paging may be adjacent or not adjacent to each other in the paging radio frame, and spacings, in the paging radio frame, between the subframes corresponding to the occasions for paging may be the same or may be different. Optionally, a location of an nth occasion for paging in the occasion set for paging may be calculated by using the following formula: i_s(n)=i_s(o)+Offset(n)*(n−1).

S604. The terminal device determines, based on the terminal device identifier, the occasion set for paging of the terminal device within the discontinuous reception period.

S605. The terminal device receives, in the time range corresponding to the occasions for paging included in the occasion set for paging, the paging message.

S604 and S605 are the same as S301 and S302 in the embodiment shown in FIG. 3.

Details are not described in this embodiment of this application again.

In this embodiment of this application, a method for determining all the occasions for paging in the occasion set for paging of the terminal device is provided. When all the occasions for paging in the occasion set for paging of the terminal device are determined, the paging radio frame in which the initial occasion for paging is located and the location, in the paging radio frame, of the initial occasion for paging are first determined, and then the occasions for paging in the occasion set for paging are determined based on the initial occasion for paging and a plurality of offsets.

Based on the embodiment shown in FIG. 6, a method for obtaining the preset quantity by the terminal device specifically includes: obtaining, by the terminal device, configuration information, and obtaining the preset quantity based on the configuration information, where the configuration information includes at least one of the following: carrier information or broadcast information; or obtaining, by the terminal device, system information, where the system information includes the preset quantity.

For example, the terminal device receives the configuration information sent by the network device, and obtains the preset quantity based on the configuration information. The configuration information includes the carrier information and/or the broadcast information. For example, the terminal device obtains the system information, and the system information includes the preset quantity.

For example, the terminal device may further obtain the preset quantity of occasion for paging offsets based on the configuration information or the system information.

Figure 7:
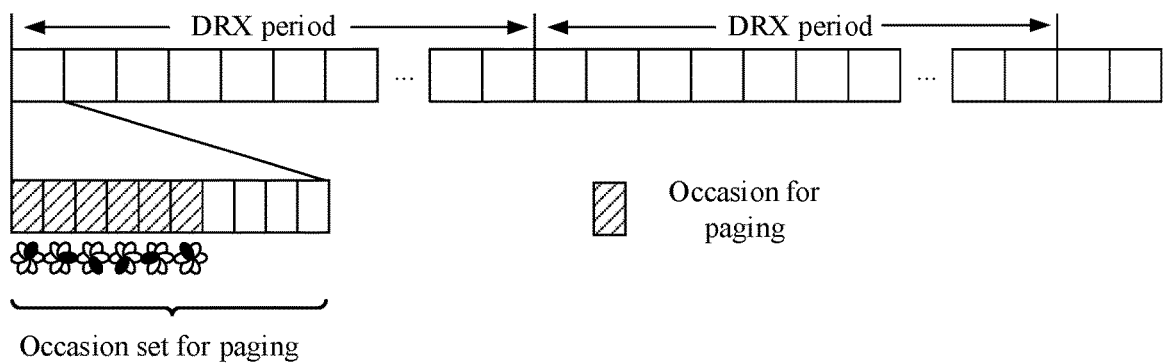
FIG. 7 is a third schematic structural diagram of a DRX period according to this application.

Based on the embodiment shown in FIG. 6, optionally, the subframes corresponding to the occasions for paging in the occasion set for paging of the terminal device are consecutive subframes in a paging radio frame. FIG. 7 is a third schematic structural diagram of a DRX period according to this application. As shown in FIG. 7, when the subframes corresponding to the occasions for paging in the occasion set for paging of the terminal device are consecutive subframes in a paging radio frame, the terminal device may receive the paging message in consecutive subframes, and does not need to switch, in one discontinuous reception period, between a sleep state and an awake state for a plurality of times, avoiding intermittent reception of the paging message and an energy loss.

Further, based on any one of the embodiments shown in FIG. 3 to FIG. 5, an embodiment of this application further provides a paging method. In this embodiment of this application, in the paging radio frame including the occasions for paging of the terminal device, the subframes corresponding to the occasions for paging have a first subcarrier spacing, and a remaining subframe in the paging radio frame has a second subcarrier spacing, where the first subcarrier spacing is greater than the second subcarrier spacing.

Figure 8:
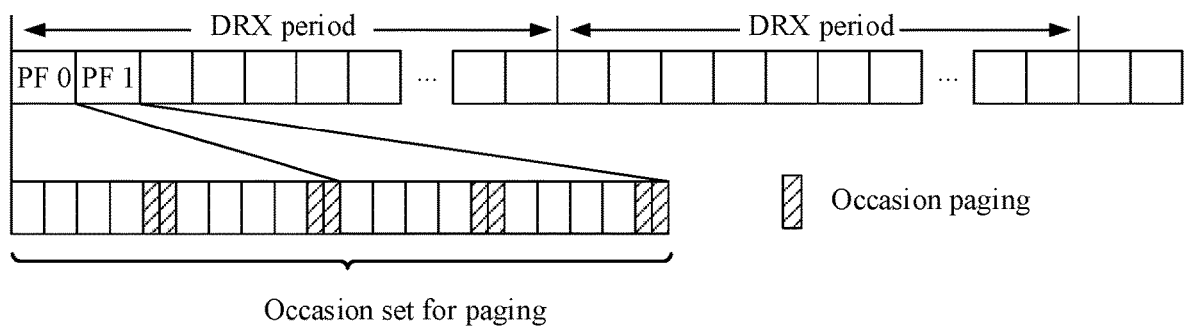
FIG. 8 is a fourth schematic structural diagram of a DRX period according to this application.

For example, the subframes corresponding to the occasions for paging in the occasion set for paging of the terminal device have a relatively large subcarrier spacing, so that a symbol included in a subframe corresponding to an occasion for paging occupies a relatively short time, and an occasion for paging may be added to the occasion set for paging when another subframe in the paging radio frame is not occupied. For example, based on a DRX period structure shown in FIG. 5, FIG. 8 is a fourth schematic structural diagram of a DRX period according to this application. As shown in FIG. 8, a subcarrier spacing of subframes corresponding to occasions for paging in the paging radio frame is 30 kilohertz, and a subcarrier spacing of another subframe in the paging radio frame is 15 kilohertz, so that an original 15 kilohertz subframe may be divided into two 30 kilohertz subframes, to enable one 15 kilohertz subframe to include two occasions for paging. The paging delay is further reduced by increasing a subcarrier frequency of a subframe corresponding to an occasion for paging.

Another aspect of the embodiments of this application further provides a paging method, applied to a network device side, corresponding to the embodiments shown in FIG. 3 to FIG. 8, and having a same or similar technical feature. Details are not described in this application again.

Figure 9:
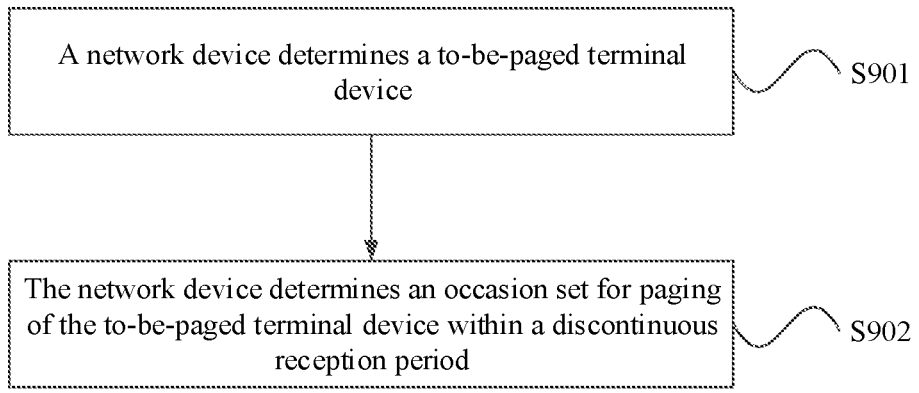
FIG. 9 is a schematic flowchart of Embodiment 4 of a paging method according to this application.

FIG. 9 is a schematic flowchart of Embodiment 4 of a paging method according to this application. As shown in FIG. 9, the paging method includes the following steps:

S901. A network device determines a to-be-paged terminal device.

S902. The network device determines an occasion set for paging of the to-be-paged terminal device within a discontinuous reception period.

The occasion set for paging includes at least two occasions for paging, and the occasions for paging included in the occasion set for paging are used to send a paging message to the to-be-paged terminal device.

Based on the embodiment shown in FIG. 9, an embodiment of this application further provides a paging method. In this embodiment, before the determining by the network device, the occasion set for paging of the to-be-paged terminal device within the discontinuous reception period, the method further includes: determining a total quantity of occasions for paging included in the occasion set for paging, and location information of all occasions for paging within the discontinuous reception period; and determining, based on the total quantity of occasions for paging included in the occasion set for paging, and the location information of all the occasions for paging within the discontinuous reception period, at least one occasion set for paging within the discontinuous reception period.

For example, all occasions for paging in any occasion set for paging are consecutive in a set including all the occasions for paging within a discontinuous reception period.

For example, based on any one of the foregoing embodiments, the paging method further includes: sending configuration information to the terminal device, where the configuration information includes at least one of the following: carrier information or broadcast information; or sending system information to the terminal device, where the system information includes the total quantity of occasions for paging included in the occasion set for paging; or sending system information to the terminal device, where the system information includes a quantity of paging radio frames included in the occasion set for paging and a quantity of occasions for paging included in the paging radio frames.

For example, an intersection set exists between a set including subframes in which synchronization signals in a synchronization signal set are located and a set including subframes in which the occasions for paging in the occasion set for paging of the terminal device are located.

For example, that the network device determines, within the discontinuous reception period, the occasion set for paging of the to-be-paged terminal device includes: determining, based on an identifier of the to-be-paged terminal device, a paging radio frame of the to-be-paged terminal device within the discontinuous reception period, and determining, in the paging radio frame of the terminal device, an initial occasion for paging; obtaining a preset quantity of occasion for paging offsets; and determining all the occasions for paging in the occasion set for paging of the to-be-paged terminal device based on the initial occasion for paging and the preset quantity of occasion for paging offsets.

For example, an embodiment of this application further provides a paging method, and the paging method in this embodiment further includes: sending configuration information to the terminal device, where the configuration information includes at least one of the following: carrier information or broadcast information; or sending system information to the terminal device, where the system information includes the preset quantity.

For example, referring to FIG. 7, subframes corresponding to the occasions for paging in the occasion set for paging of the to-be-paged terminal device are consecutive subframes in a paging radio frame.

For example, referring to FIG. 8, in the radio paging radio frame including the occasions for paging of the to-be-paged terminal device, the subframes corresponding to the occasions for paging have a first subcarrier spacing, and a remaining subframe in the paging radio frame has a second subcarrier spacing, where the first subcarrier spacing is greater than the second subcarrier spacing.

Still another aspect of the embodiments of this application further provides a paging apparatus, configured to perform the paging method on a terminal device side in the foregoing embodiments. The paging method has a same or similar technical feature, and details are not described in this application again.

Figure 10:
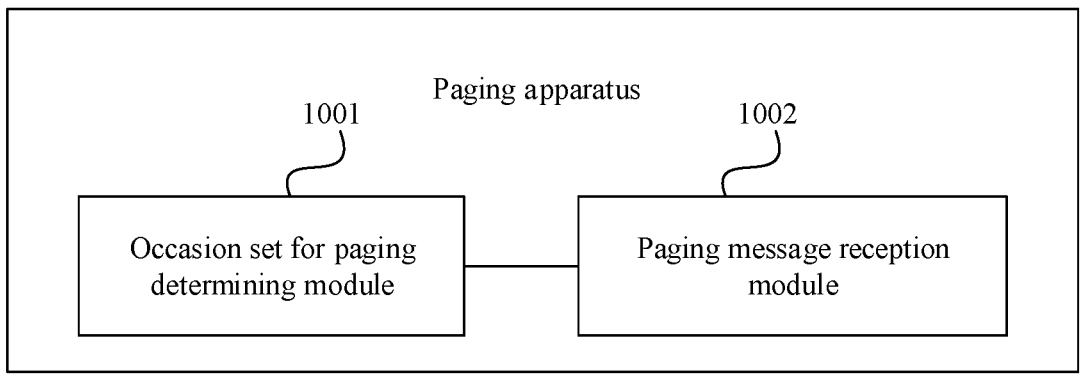
FIG. 10 is a schematic structural diagram of Embodiment 1 of a paging apparatus according to this application.

FIG. 10 is a schematic structural diagram of Embodiment 1 of a paging apparatus according to this application. In this embodiment, the paging apparatus may be implemented by using software, hardware, or a combination of software and hardware. As shown in FIG. 10, the paging apparatus includes: an occasion set for paging determining module 1001, configured to determine based on a paging apparatus identifier, an occasion set for paging of the paging apparatus within a discontinuous reception period, where the occasion set for paging includes at least two occasions for paging; and a paging message receiving module 1002, configured to receive, in a time range corresponding to the occasions for paging included in the occasion set for paging, a paging message.

Optionally, the paging apparatus further includes: an information obtaining module, configured to determine a total quantity of occasions for paging included in the occasion set for paging, and location information of all occasions for paging within the discontinuous reception period; and an occasion set for paging partitioning module, configured to determine based on the total quantity of occasions for paging included in the occasion set for paging, and the location information of all the occasions for paging within the discontinuous reception period, at least one occasion set for paging within the discontinuous reception period.

Optionally, all occasions for paging in any occasion set for paging are consecutive occasions for paging in a set including all the occasions for paging within a discontinuous reception period.

Optionally, the information obtaining module is specifically configured to: obtain a total quantity of synchronization signals in a synchronization signal set by using carrier information or broadcast information, and determine, based on the total quantity of synchronization signals, the total quantity of occasions for paging included in the occasion set for paging; or obtain system information, where the system information includes the total quantity of occasions for paging included in the occasion set for paging; or obtain system information, where the system information includes a quantity of paging radio frames included in the occasion set for paging and a quantity of occasions for paging included in the paging radio frames, and determine, based on the quantity of paging radio frames included in the occasion set for paging and the quantity of occasions for paging included in the paging radio frames, the total quantity of occasions for paging included in the occasion set for paging.

Optionally, an intersection set exists between a set including subframes in which the synchronization signals in the synchronization signal set are located and a set including subframes in which the occasions for paging in the occasion set for paging of the terminal device are located.

Optionally, the occasion set for paging determining module 1001 is specifically configured to: determine based on the paging apparatus identifier, a paging radio frame of the paging apparatus within the discontinuous reception period, and determine, in the paging radio frame of the paging apparatus, an initial occasion for paging; obtain a preset quantity of occasion for paging offsets; and determine all the occasions for paging in the occasion set for paging of the paging apparatus based on the initial occasion for paging and the preset quantity of occasion for paging offsets.

Optionally, the information obtaining module is further configured to: obtain the preset quantity by using carrier information or broadcast information; or obtain system information, where the system information includes the preset quantity.

Optionally, subframes corresponding to the occasions for paging in the occasion set for paging of the paging apparatus are consecutive subframes in a paging radio frame.

Optionally, in the paging radio frame including the occasions for paging of the paging apparatus, the subframes corresponding to the occasions for paging have a first subcarrier spacing, and a remaining subframe in the paging radio frame has a second subcarrier spacing, where the first subcarrier spacing is greater than the second subcarrier spacing.

Yet another aspect of the embodiments of this application further provides a paging apparatus, configured to perform the paging method on the network device side in the foregoing embodiments. The paging method has a same technical feature and technical effect, and details are not described in this application again.

Figure 11:
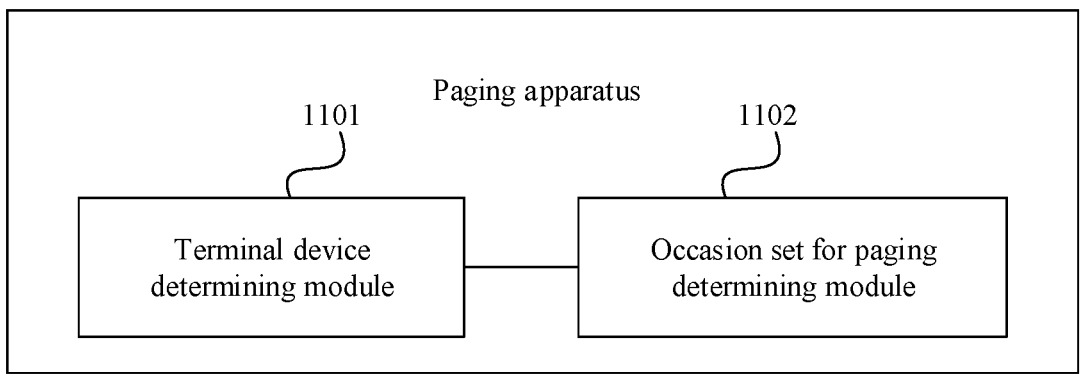
FIG. 11 is a schematic structural diagram of Embodiment 2 of a paging apparatus according to this application.

FIG. 11 is a schematic structural diagram of Embodiment 2 of a paging apparatus according to this application. In this embodiment, the paging apparatus may be implemented by using software, hardware, or a combination of software and hardware. As shown in FIG. 11, the paging apparatus includes: a terminal device determining module 1101, configured to determine a to-be-paged terminal device; and an occasion set for paging determining module 1102, configured to determine an occasion set for paging of the to-be-paged terminal device within a discontinuous reception period, where the occasion set for paging includes at least two occasions for paging, and the occasions for paging included in the occasion set for paging are used to send a paging message to the to-be-paged terminal device.

Optionally, the paging apparatus further includes: an information obtaining module, configured to determine a total quantity of occasions for paging included in the occasion set for paging, and location information of all occasions for paging within the discontinuous reception period; and an occasion set for paging partitioning module, configured to determine based on the total quantity of occasions for paging included in the occasion set for paging, and the location information of all the occasions for paging within the discontinuous reception period, at least one occasion set for paging within the discontinuous reception period.

Optionally, all occasions for paging in any occasion set for paging are consecutive occasions for paging in a set including all the occasions for paging within a discontinuous reception period.

Optionally, the paging apparatus further includes a sending module. The sending module is configured to: indicate, to the terminal device by using carrier information or broadcast information, the total quantity of occasions for paging included in the occasion set for paging; or send system information to the terminal device, where the system information includes the total quantity of occasions for paging included in the occasion set for paging; or send system information to the terminal device, where the system information includes a quantity of paging radio frames included in the occasion set for paging and a quantity of occasions for paging included in the paging radio frames.

Optionally, an intersection set exists between a set including subframes in which synchronization signals in a synchronization signal set are located and a set including subframes in which the occasions for paging in the occasion set for paging of the terminal device are located.

Optionally, the occasion set for paging determining module 1102 is specifically configured to: determine based on an identifier of the to-be-paged terminal device, a paging radio frame of the to-be-paged terminal device within the discontinuous reception period, and determine, in the paging radio frame of the terminal device, an initial occasion for paging; obtain a preset quantity of occasion for paging offsets; and determine all the occasions for paging in the occasion set for paging of the to-be-paged terminal device based on the initial occasion for paging and the preset quantity of occasion for paging offsets.

Optionally, the paging apparatus further includes a sending module. The sending module is configured to: indicate the preset quantity to the terminal device by using carrier information or broadcast information; or send system information to the terminal device, where the system information includes the preset quantity.

Optionally, subframes corresponding to the occasions for paging in the occasion set for paging of the to-be-paged terminal device are consecutive subframes in a paging radio frame.

Optionally, in the radio paging radio frame including the occasions for paging of the to-be-paged terminal device, the subframes corresponding to the occasions for paging have a first subcarrier spacing, and a remaining subframe in the paging radio frame has a second subcarrier spacing, where the first subcarrier spacing is greater than the second subcarrier spacing.

Still yet another aspect of the embodiments of this application further provides a terminal device, configured to perform the paging method in the foregoing embodiments. The paging method has a same technical feature and technical effect, and details are not described in this application again.

Figure 12:
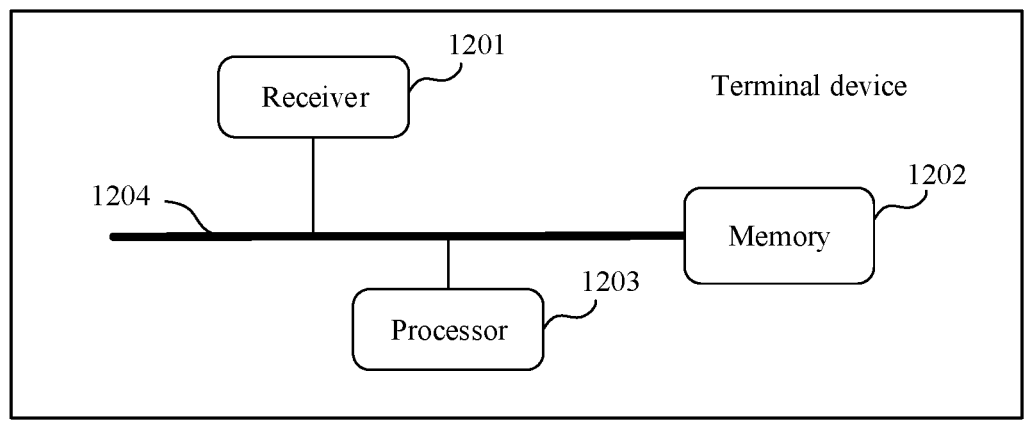
FIG. 12 is a schematic structural diagram of a terminal device according to this application.

FIG. 12 is a schematic structural diagram of a terminal device according to this application. As shown in FIG. 12, the terminal device includes: a receiver 1201, a memory 1202, a processor 1203, and at least one communications bus 1204. The communications bus 1204 is configured to implement communication connections between components. The memory 1202 may include a high-speed random memory, or may include a non-volatile memory, for example, at least one magnetic disk storage. The memory 1202 may store various programs to complete various processing functions and implement method steps in this embodiment. The processor 1203 is configured to execute the programs stored in the memory 1202. In this embodiment, the receiver 1201 may be a radio frequency processing module or a baseband processing module in a network device. The receiver 1201 is coupled to the processor 1203.

The processor 1203 is configured to: determine based on a terminal device identifier, an occasion set for paging of the terminal device within a discontinuous reception period, where the occasion set for paging includes at least two occasions for paging; and receive, in a time range corresponding to the occasions for paging included in the occasion set for paging, a paging message.

Optionally, the processor 1203 is further configured to: determine a total quantity of occasions for paging included in the occasion set for paging, and location information of all occasions for paging within the discontinuous reception period; and determine, within the discontinuous reception period, at least one occasion set for paging based on the total quantity of occasions for paging included in the occasion set for paging, and the location information of all the occasions for paging within the discontinuous reception period.

Optionally, all occasions for paging in any occasion set for paging are consecutive occasions for paging in a set including all the occasions for paging within the discontinuous reception period.

Optionally, the processor 1203 is specifically configured to: obtain a total quantity of synchronization signals in a synchronization signal set by using carrier information or broadcast information, and determine, based on the total quantity of synchronization signals, the total quantity of occasions for paging included in the occasion set for paging; or obtain system information, where the system information includes the total quantity of occasions for paging included in the occasion set for paging; or obtain system information, where the system information includes a quantity of paging radio frames included in the occasion set for paging and a quantity of occasions for paging included in the paging radio frames, and determine, based on the quantity of paging radio frames included in the occasion set for paging and the quantity of occasions for paging included in the paging radio frames, the total quantity of occasions for paging included in the occasion set for paging.

Optionally, an intersection set exists between a set including subframes in which the synchronization signals in the synchronization signal set are located and a set including subframes in which the occasions for paging in the occasion set for paging of the terminal device are located.

Optionally, the processor 1203 is specifically configured to: determine based on the terminal device identifier, a paging radio frame of the terminal device within the discontinuous reception period, and determine, in the paging radio frame of the terminal device, an initial occasion for paging; obtain a preset quantity of occasion for paging offsets; and determine all the occasions for paging in the occasion set for paging of the terminal device based on the initial occasion for paging and the preset quantity of occasion for paging offsets.

Optionally, the processor 1203 is further configured to: obtain the preset quantity by using carrier information or broadcast information; or obtain system information, where the system information includes the preset quantity.

Optionally, subframes corresponding to the occasions for paging in the occasion set for paging of the terminal device are consecutive subframes in a paging radio frame.

Optionally, in the paging radio frame including the occasions for paging of the terminal device, the subframes corresponding to the occasions for paging have a first subcarrier spacing, and a remaining subframe in the paging radio frame has a second subcarrier spacing, where the first subcarrier spacing is greater than the second subcarrier spacing.

A still yet further aspect of the embodiments of this application further provides a network device, configured to perform the paging method in the foregoing embodiments. The paging method has a same technical feature and technical effect, and details are not described in this application again.

Figure 13:
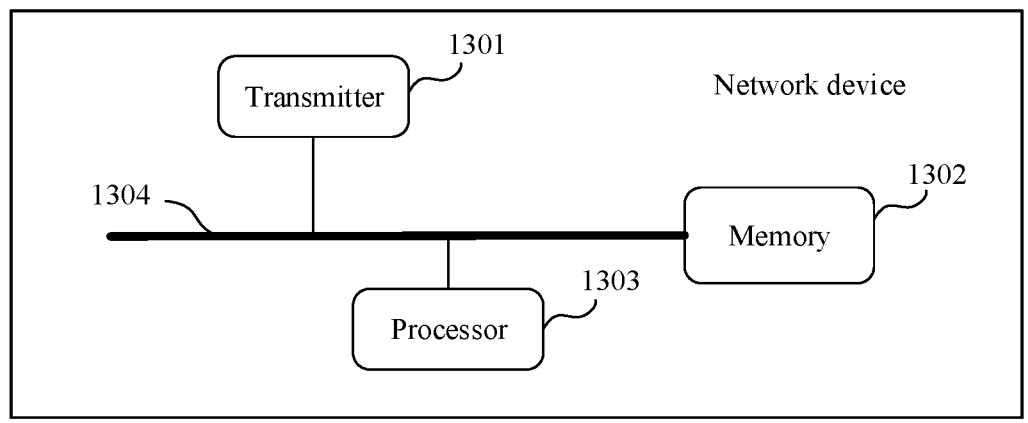
FIG. 13 is a schematic structural diagram of a network device according to this application.

FIG. 13 is a schematic structural diagram of a network device according to this application. As shown in FIG. 13, the network device includes a transmitter 1301, a memory 1302, a processor 1303, and at least one communications bus 1304. The communications bus 1304 is configured to implement communication connections between components. The memory 1302 may include a high-speed random memory, or may include a non-volatile memory, for example, at least one magnetic disk storage. The memory 1302 may store various programs to complete various processing functions and implement method steps in this embodiment. The processor 1303 is configured to execute the programs stored in the memory 1302. In this embodiment, the transmitter 1301 may be a radio frequency processing module or a baseband processing module in a terminal device. The transmitter 1301 is coupled to the processor 1303.

The processor 1303 is configured to: determine a to-be-paged terminal device; determine an occasion set for paging of the to-be-paged terminal device within a discontinuous reception period, where the occasion set for paging includes at least two occasions for paging, and the occasions for paging included in the occasion set for paging are used to send a paging message to the to-be-paged terminal device.

Optionally, the processor 1303 is further configured to: determine a total quantity of occasions for paging included in the occasion set for paging, and location information of all occasions for paging within the discontinuous reception period; and determine based on the total quantity of occasions for paging included in the occasion set for paging, and the location information of all the occasions for paging within the discontinuous reception period, at least one occasion set for paging within the discontinuous reception period.

Optionally, all occasions for paging in any occasion set for paging are consecutive occasions for paging in a set including all the occasions for paging within the discontinuous reception period.

Optionally, the transmitter 1301 is configured to: indicate, to the terminal device by using carrier information or broadcast information, the total quantity of occasions for paging included in the occasion set for paging; or send system information to the terminal device, where the system information includes the total quantity of occasions for paging included in the occasion set for paging; or send system information to the terminal device, where the system information includes a quantity of paging radio frames included in the occasion set for paging and a quantity of occasions for paging included in the paging radio frames.

Optionally, an intersection set exists between a set including subframes in which synchronization signals in a synchronization signal set are located and a set including subframes in which the occasions for paging in the occasion set for paging of the terminal device are located.

Optionally, the processor 1303 is specifically configured to: determine, within the discontinuous reception period, a paging radio frame of the to-be-paged terminal device based on an identifier of the to-be-paged terminal device, and determine, in the paging radio frame of the terminal device, an initial occasion for paging; obtain a preset quantity of occasion for paging offsets; and determine all the occasions for paging in the occasion set for paging of the to-be-paged terminal device based on the initial occasion for paging and the preset quantity of occasion for paging offsets.

Optionally, the transmitter 1301 is configured to: indicate the preset quantity to the terminal device by using carrier information or broadcast information; or send system information to the terminal device, where the system information includes the preset quantity.

Optionally, subframes corresponding to the occasions for paging in the occasion set for paging of the to-be-paged terminal device are consecutive subframes in a paging radio frame.

Optionally, in the radio paging radio frame including the occasions for paging of the to-be-paged terminal device, the subframes corresponding to the occasions for paging have a first subcarrier spacing, and a remaining subframe in the paging radio frame has a second subcarrier spacing, where the first subcarrier spacing is greater than the second subcarrier spacing.

In addition, it should be noted and understood that modules division of the foregoing network device and terminal device is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in this application may be integrated into one processing unit, or each of the units may exist alone physically, or two or more units are integrated into one unit. The integrated unit may be implemented in a form of hardware, or may be implemented in a form of hardware in addition to a software functional unit.

An embodiment of this application further provides a program. When being executed by a processor, the program is configured to perform the foregoing paging method on the terminal device side in the foregoing embodiments. An embodiment of this application further provides a program product, for example, a computer-readable storage medium, including the program described above. An embodiment of this application further provides a computer-readable storage medium. The computer-readable storage medium stores an instruction. When the instruction is run on a computer, the computer is enabled to perform the foregoing paging method on the terminal device side in the foregoing embodiments.

An embodiment of this application further provides a program. When being executed by a processor, the program is configured to perform the foregoing paging method on the network device side in the foregoing embodiments. An embodiment of this application further provides a program product, for example, a computer-readable storage medium, including the program described above. An embodiment of this application further provides a computer-readable storage medium. The computer-readable storage medium stores an instruction. When the instruction is run on a computer, the computer is enabled to perform the foregoing paging method on the network device side in the foregoing embodiments.

What is claimed is:

1. A method, comprising:
   determining, by a terminal device according to a terminal device identifier, an occasion set for paging the terminal device within a discontinuous reception period, wherein the occasion set for paging the terminal device comprises a first occasion for paging the terminal device and a second occasion for paging the terminal device, and a total quantity of occasions for paging comprised in the occasion set for paging the terminal device is equal to a total quantity of synchronization signals in a synchronization signal set; and
   receiving, by the terminal device in the first occasion for paging, a paging message.

2. The method according to claim 1, wherein the receiving, by the terminal device in the first occasion for paging, the paging message comprises:
   detecting, by the terminal device, a physical downlink control channel (PDCCH) with paging radio network temporary identity (P-RNTI); and
   detecting, by the terminal device, the paging message in a physical downlink shared channel (PDSCH).

3. The method according to claim 1, wherein the method further comprises:
   determining, by the terminal device, location information of all occasions for paging within the discontinuous reception period; and
   determining, by the terminal device, according to the total quantity of occasions for paging comprised in the occasion set for paging the terminal device and according to the location information of all the occasions for paging within the discontinuous reception period, an occasion for paging within the discontinuous reception period.

4. The method according to claim 1, wherein all occasions for paging in the occasion set for paging the terminal device are consecutive occasions for paging in time domain.

5. The method according to claim 1, wherein the method further comprises:
   obtaining, by the terminal device, the total quantity of the synchronization signals in the synchronization signal set through broadcast information.

6. The method according to claim 1, wherein determining by the terminal device according to the terminal device identifier, the occasion set for paging the terminal device within the discontinuous reception period comprises:
   determining, by the terminal device according to the terminal device identifier, a paging radio frame of the terminal device within the discontinuous reception period; and determining, by the terminal device, in the paging radio frame of the terminal device, an initial occasion for paging the terminal device.

7. The method according to claim 1, the method further comprises:
determining, by the terminal device, an index of the occasion set for paging the terminal device according to the terminal device identifier.

8. The method according to claim 1, wherein occasions for paging comprised in the occasion set for paging the terminal device are in different paging radio frames.

9. An apparatus, comprising:
a processor; and
a non-transitory computer-readable storage medium storing a program to be excuted by the processor, the program including instructions to:
determine a terminal device to page;
determine an occasion set for paging the terminal device within a discontinuous reception period, wherein:
the occasion set for paging the terminal device comprises a first occasion for paging the terminal device and a second occasion for paging the terminal device, and a total quantity of occasions for paging comprised in the occasion set for paging the terminal device is equal to a total quantity of synchronization signals in a synchronization signal set; and
send a paging message to the terminal device in the first occasion for paging the terminal device.

10. The apparatus according to claim 9, wherein the instructions include further instructions to:
determine location information of all occasions for paging within the discontinuous reception period; and
determine, according to the total quantity of occasions for paging comprised in the occasion set for paging the terminal device and according to the location information of all the occasions for paging within the discontinuous reception period, an occasion for paging within the discontinuous reception period.

11. The apparatus according to claim 9, wherein all occasions for paging in the occasion set for paging the terminal device are consecutive occasions for paging in time domain.

12. The apparatus according to claim 9, wherein the instructions include further instructions to:
indicate, to the terminal device through broadcast information, the total quantity of occasions for paging comprised in the occasion set for paging the terminal device.

13. The apparatus according to claim 9, wherein the instructions include further instructions to:
determine, according to an identifier of the terminal device, a paging radio frame of the terminal device within the discontinuous reception period; and
determine, in the paging radio frame of the terminal device, an initial occasion for paging the terminal device.

14. The apparatus according to claim 9, wherein the instructions include further instructions to:
determine an index of the occasion set for paging according to a terminal device identifier.

15. The apparatus according to claim 9, wherein occasions for paging comprised in the occasion set for paging are in different paging radio frames.

16. A terminal device, comprising:
a processor; and
a non-transitory computer-readable storage medium storing a program to be executed by the processor, the program including instructions to:
determine according to a terminal device identifier, an occasion set for paging the terminal device within a discontinuous reception period, wherein the occasion set for paging the terminal device comprises a first occasion for paging the terminal device and a second occasion for paging the terminal device, and a total quantity of occasions for paging comprised in the occasion set for paging the terminal device is equal to a total quantity of synchronization signals in a synchronization signal set; and
receive, in the first occasion for paging, a paging message.

17. The terminal device according to claim 16, wherein the instructions include further instructions to:
detect a physical downlink control channel (PDCCH) with paging radio network temporary identity (P-RNTI); and
detect the paging message in a physical downlink shared channel (PDSCH).

18. The terminal device according to claim 16, wherein the instructions include further instructions to:
determine location information of all occasions for paging within the discontinuous reception period; and
determine according to the total quantity of occasions for paging comprised in the occasion set for paging the terminal device and according to the location information of all occasions for paging within the discontinuous reception period, an occasion for paging within the discontinuous reception period.

19. The terminal device according to claim 16, wherein all occasions for paging in the occasion set for paging the terminal device are consecutive occasions for paging in time domain.

20. The terminal device according to claim 16, wherein the instructions include further instructions to:
obtain the total quantity of the synchronization signals in the synchronization signal set through broadcast information.

21. The terminal device according to claim 16, wherein the instructions include further instructions to:
determine, according to the terminal device identifier, a paging radio frame of the terminal device within the discontinuous reception period; and
determine, in the paging radio frame of the terminal device, an initial occasion for paging the terminal device.

22. The terminal device according to claim 16, wherein the instructions include further instructions to:
determine an index of the occasion set for paging according to the terminal device identifier.

23. The terminal device according to claim 16, wherein occasions for paging comprised in the occasion set for paging are in different paging radio frames.

* * * * *